United States Patent Office 3,770,725
Patented Nov. 6, 1973

3,770,725
17β-CYANO-UNSATURATED STEROIDS, PROCESS AND THERAPEUTIC METHOD
Jean-Claude Gasc, Bondy, and Robert Bucourt, Paris, France, assignors to Roussel-UCLAF, Paris, France
No Drawing. Filed May 31, 1972, Ser. No. 258,324
Claims priority, application France, June 1, 1971, 19,711
Int. Cl. C07c 169/22
U.S. Cl. 260—239.5       17 Claims

ABSTRACT OF THE DISCLOSURE

17β-cyano steroids having the formula

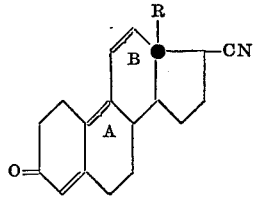

wherein R is alkyl having 1 to 3 carbon atoms, A is selected from the group consisting of two hydrogens and a double bond and B is selected from the group consisting of two hydrogens and a double bond, with the proviso that when B is a double bond, A is a double bond, as well as their process of preparation and therapeutic compositions and methods. The 17β-cyano steroids possess a progestomimetic activity, an anti-estrogenic activity and an exogenic anti-androgenic activity.

THE PRIOR ART

17β - cyano - 3 - mesyloxy - $\Delta^{1,3,5(10)}$-estratriene and 3-acetoxy - 17 - cyano - $\Delta^5$ - androstene are described respectively in Pure Appl. Chem. (1968), 16, pages 1 to 15 and U.S. Pat. No. 2,326,756. These compounds, while structurally related to the above, are neither homology or isomers and do not have comparable physiological properties.

OBJECTS OF THE INVENTION

An object of the present invention is the obtaining of novel unsaturated steroids having a 17β-cyano group and interesting pharmacological properties.

Another object of the present invention is the obtaining of 17β-cyano steroids having the formula

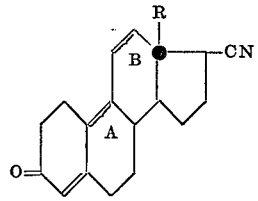

wherein R is alkyl having 1 to 3 carbon atoms, A is selected from the group consisting of two hydrogens and a double bond and B is selected from the group consisting of two hydrogens and a double bond, with the proviso that when B is a double bond, A is a double bond.

A further object of the present invention is the development of a process for the preparation of the above 17β-cyano steroids comprising reacting a 3,3-dilower alkyl ketal of a 13β-R-$\Delta^{5(10)}$-gonen-3,17-dione with a cyclic ketalization agent selected from the group consisting of lower alkylene glycols and dioxolanes, reacting the resultant 3-ketal steroid having the formula

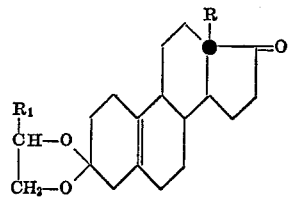

wherein R has the previously assigned value, $R_1$ is hydrogen or alkyl having 1 to 5 carbon atoms, with a cyanidation agent in a lower alkanol, dehydrating the resultant 17-cyano-17-hydroxy steroid having the formula

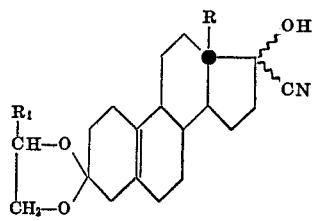

wherein R and $R_1$ have the above-assigned values by the action of an acidic dehydrating agent, reducing the $\Delta^{16}$ double bond of the resulting 17-cyano-$\Delta^{16}$ steroid having the formula

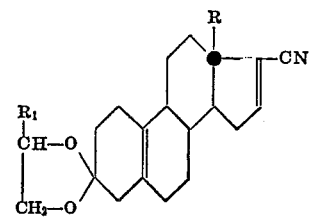

wherein R and $R_1$ have the above-assigned values, by selective hydrogenation in the presence of a hydrogenation catalyst, subjecting the resulting 3-ketal-17β-cyano steroid having the formula

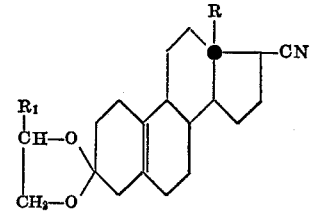

wherein R and $R_1$ have the above-assigned values to acid hydrolysis and recovering said 17β-cyano steroids.

A yet further object of the present invention is the development of therapeutic compositions and methods of therapeutic treatment utilizing the above 17β-cyano steroids.

These and other objects of the invention will become more apprent as the description thereof proceeds.

DESCRIPTION OF THE INVENTION

The present invention relates to novel unsaturated steroids derivatives containing a 17β-cyano group and to the process for preparation of these compounds.

The invention more particularly relates to steroid derivatives of the general Formula I:

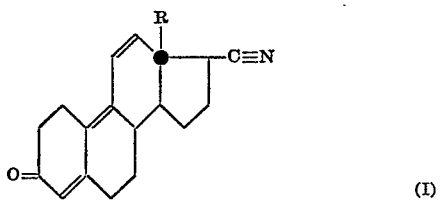
(I)

in which the dotted lines represent possible double bonds and R represents an alkyl radical having 1 to 3 carbon atoms. More particularly the invention relates to 17β-cyano steroids having the formula

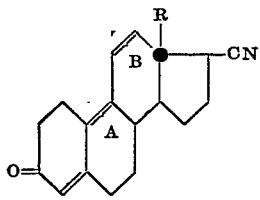

wherein R is alkyl having 1 to 3 carbon atoms, A is selected from the group consisting of two hydrogens and a double bond and B is selected from the group consisting of two hydrogens and a double bond, with the proviso that when B is a double bond, A is a double bond. Specifically, the invention relates to 13β-R-17β-cyan-Δ$^{4,9,11}$-gonatrien-3-ones of the Formula I$_A$

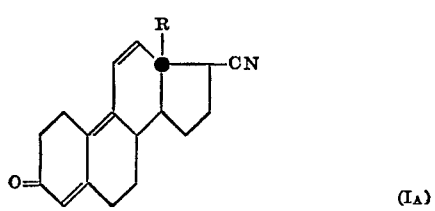
(I$_A$)

wherein R has the above-assigned values, 13β-R-17β-cyano-Δ$^{4,9}$-gonadien-3-ones of the Formula I$_B$:

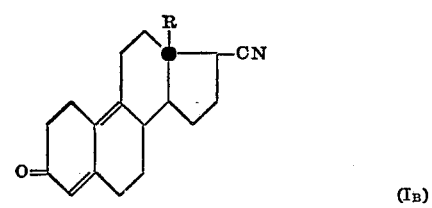
(I$_B$)

wherein R has the above-assigned values and 13β-R-17β-cyano-Δ$^4$-gonen-3-ones of the Formula I$_C$.

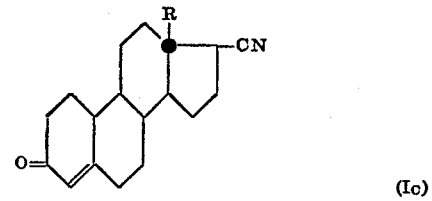
(I$_C$)

wherein R has the above-assigned values.

The invention includes pharmaceutical compositions containing at least one of the therapeutically active compounds included in the General Formula I, as well as therapeutic methods utilizing the pharmaceutical compositions.

The compounds of the invention are endowed with interesting pharmacological properties. They exhibit particularly a progestomimetic activity, an anti-estrogenic activity and an anti-androgenic activity of an exogenic character. The compounds and pharmaceutical compositions containing them may be utilized for the treatment of prostatic adenoma, of hyperandrogenia, of acne, of hirsutism and of the manifestations of hyperestrogenia. They may in addition be utilized in the treatment of sterility, dysmenorrhea, ovarial dystrophy, etc.

The compounds of the General Formula I may be utilized orally, perlingually, trancutaneously, rectally. They may be presented as injectable solutions or suspensions, packed in ampoules, multiple-dose vials, implants, tablets, coated tablets, sublingual tablets, capsules and suppositories.

The useful posology ranges between 1 and 500 mg. daily in adults, dependent upon the therapeutic indication and the method of administration. The compounds of General Formula I are administered to warm-blooded animals in amounts of from 0.01 to 10 mg./kg. per day. The pharmaceutical forms, such as: injectable solutions or suspensions, implants, tablets, coated tablets, sublingual tablets, capsules and suppositories are prepared by conventional processes.

The invention also relates to a process for the preparation of the compounds of the invention starting from 3,3-alkoxy-Δ$^{5(10)}$-estren-17-ones described in French Pat. 1,325,398 and the higher homology in the 13β position, prepared by the same process. In this process, first 13β-R-17β-cyano-Δ$^4$-gonen-3-ones, of Formula I$_C$ are produced. This process comprises reacting a 3,3-di-lower-alkoxy-13β-R-Δ$^{5(10)}$-gonen-17-one of the Formula VI

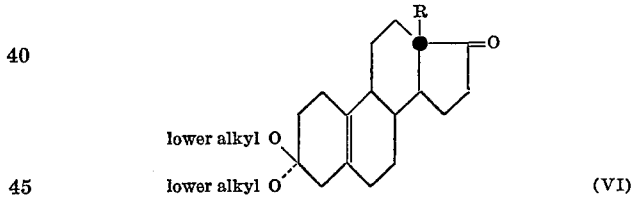
(VI)

wherein R has the above-assigned values, with a suitable ketalization reagent, such as a lower alkylene glycol or a dioxolane, subjecting the resulting 3-ketal steroid having the Formula VII

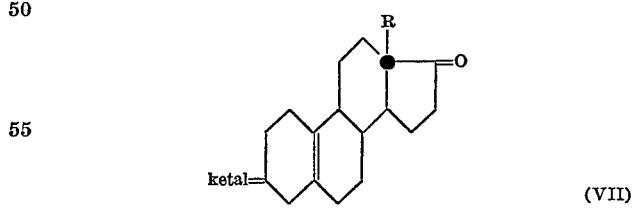
(VII)

wherein R has the above-assigned values and "ketal" is a cyclic ketal, preferably of the formula

where R$_1$ is alkyl having 1 to 5 carbon atoms, to the action of a cyanidation agent in a lower alkanol, reacting the resultant 3-ketal-13β-R-17ξ-hydroxy-17ξ-cyano-Δ$^{5(10)}$-gonene of Formula VIII

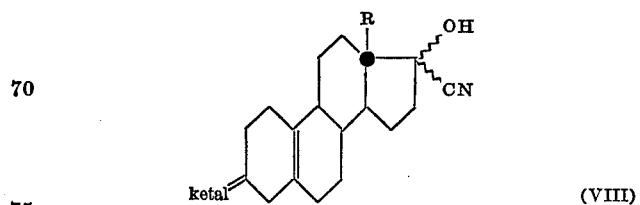
(VIII)

wherein R and "ketal" have the above-assigned values, with an acidic dehydrating agent, subjecting the resultant 3-ketal-13β-R-17-cyano-Δ$^{5(10),16}$-gonadiene of Formula IX

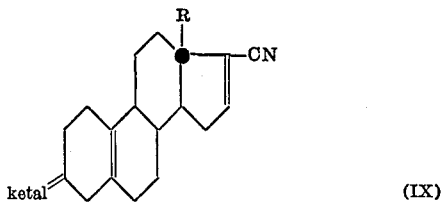

wherein R and "ketal" have the above-assigned values, to a selective reduction with hydrogen in the presence of a catalyst, hydrolyzing the resultant 3-ketal-13β-R-17β-cyano-Δ$^{5(10)}$-gonene of the Formula X

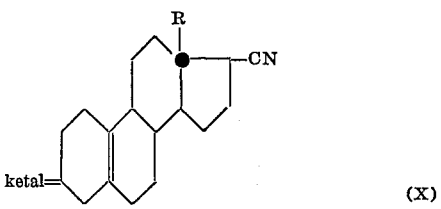

wherein R and "ketal" have the above-assigned values, by the action of a strong acid, and recovering 13β-R-17β-cyano-Δ$^4$-gonen-3-one of the Formula I$_C$ (I, with a double bond in the 4,5 position).

The ketalization agent used to obtain a cyclic ketal in the 3-position of the 13β-R-Δ$^{5(10)}$-gonen-3,17-dione, VII, is preferably a lower alkylene glycol with 2 to 4 carbon atoms, such as ethylene glycol or propylene glycol. The reaction is carried out in the presence of an acidic catalyst.

The cyanidation agent used to obtain the cyanohydrins, VIII, is preferably an alkali metal cyanide, such as sodium or potassium cyanide. The cyanidation is then carried out in the presence of a lower alkanol, such as methanol, ethanol, propanol, isopropanol. The cyanidation agent may also be acetone cyanohydrin which is used in an alkaline medium.

After cyanidation a mixture of the two cyanohydrins is obtained, which can be dehydrated, as is. The mixture of the cyanohydrins may also be purified, especially by chromatography and the dehydration of one or the other of the isolated cyanohydrins or on the mixture of these cyanohydrins may be carried out.

The dehydrating agent, to whose action the cyanohydrin VIII is subjected, is preferably phosphorus oxychloride or thionyl chloride in the presence of pyridine.

The selective catalytic reduction by hydrogen of the 16 (17) double bond of the cyclic ketal in the 3-position of 3-ketal-13β-R-17-cyano-Δ$^{5(10),16}$-gonadiene, IX, cannot be carried out in the presence of any catalyst. In fact, if the catalyst is too active, there is the risk of hydrogenating, more or less completely, the 5(10) double bond. In order to obtain a selective reaction, palladium on alumina, treated with lead acetate, is advantageously used [catalyst of the type used by Lindlar Helv. Chim. Acta 35, 446 (1952)].

The strong acid, utilized to effect the hydrolysis of the ketal X, is especially hydrochloric acid, sulfuric acid, perchloric acid, p-toluene sulfonic acid. This hydrolysis may be effected in the presence of one or several organic solvents, such as an alcohol or a hydrocarbon.

The invention also relates to a process of preparation of the 13β-R-17β-cyano-Δ$^{4,9}$-gonadienes of Formula I$_B$. This process comprises reacting the 3-ketal-13β-R-17β-cyano-Δ$^{5(10)}$-gonene of Formula X, obtained as outlined above, with an organic carboxylic acid, preferably one having 2 to 6 carbon atoms, brominating the resulting 13β-R-17β-cyano-Δ$^{5(10)}$-gonen-3-one of the Formula V

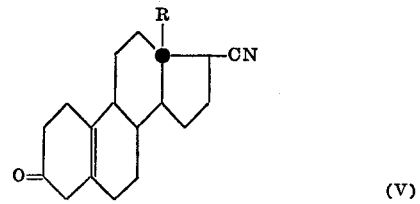

wherein R has the above-assigned values, dehydrobrominating the intermediate dibromo compound and recovering the desired 13β-R-17β-cyano-Δ$^{4,9}$-gonadien-3-one of Formula I$_B$ (I, with two double bonds).

The organic carboxylic acid, used to hydrolyze the cyclic ketal X to get, without a shift of the double bond, 13β-R-17β-cyano-Δ$^{5(10)}$-gonen-3-one, V, is especially acetic acid, oxalic acid, citric acid, tartaric acid, etc. This hydrolysis is carried out in an organic solvent or in a mixture of organic solvents, such as hydrocarbons or ethers.

The bromination, followed by the dehydrobromination of 13β-R-17β-cyano-Δ$^{5(10)}$-gonen-3-one, V, is effected by bromine in pyridine or by the pyridinium perbromide in pyridine.

The process of preparation of 13β-R-17β-cyano-Δ$^{4,9,11}$-gonatrien-3-one of Formula I$_A$ is also provided by the invention. This process comprises reacting 13β-R-17β-cyano-Δ$^{4,9}$-gonadien-3-one of Formula I$_B$ with a secondary linear or cyclic amine, hydrolyzing the resultant 3-enamine of the Formula II

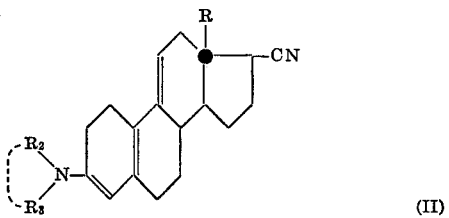

wherein R has the above-assigned values and R$_2$ and R$_3$ represent two lower alkyls, a phenyl and a lower alkyl, alkylene having 4 to 5 carbon atoms, ethyloxaethylene and ethylazaethylene, in an acidic medium, subjecting the resultant 13β-R-17β-cyano-Δ$^{5(10),9(11)}$-gonadien-3-one of the Formula III

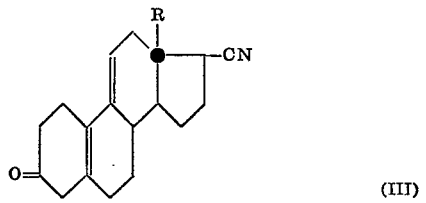

wherein R has the above-assigned values, to the dehydrogenating action of a substituted parabenzoquinone, and recovering the desired 13β-R-17β-cyano-Δ$^{4,9,11}$-gonadien-3-ones of Formula I$_A$.

The secondary amine, which is reacted with 13β-R-17β-cyano-Δ$^{4,9}$-gonadien-3-one, I$_B$, is preferably pyrrolidine. Also a di-lower-alkylamine, such as diethylamine or an alkylarylamine, preferably a lower alkylphenylamine, such as methylaniline may be used.

The reaction of 13β-R-17β-cyano-Δ$^{4,9}$-gonadien-3-one with the pyrrolidine is carried out in an organic solvent, preferably a lower alkanol, such as methanol, ethanol, propanol, isopropanol.

The acidic agent, used for the hydrolysis of the enamine is preferably formic acid, acetic acid, or tartaric acid. This hydrolysis is conveniently carried out in an organic solvent, such as ether.

The substituted parabenzoquinone used to effect the oxidation (dehydrogenation) of 13β-R-17β-cyano-Δ$^{5(10),9(11)}$-gonadien-3-one, III, may particularly be selected from the group consisting of 2,3-dichloro-5,6-dicyano-parabenzoquinone, 2,3 - dibromo-5,6-dicyano-parabenzoquinone, 2,3,5,6 - tetrachloro-parabenzoquinone, 2,3 - dicyano-5-chloroparabenzoquinone and 2,3-dicyano - parabenzoquinone.

This oxidation reaction is carried out in inert organic solvent, such as methylene chloride, dichloroethane, benzene, toluene, dioxan, ethyl acetate, ethyl ether, etc.

The following examples are illustrative of the invention without being deemed limitative in any manner.

EXAMPLES

The 3,3-alkoxy-5(10)-estren-17-ones used as starting materials are obtained by the process given in French Pat. No. 1,325,398. The higher homologs in the 13-position of this compound may be obtained by a process analogous to that of the above French patent.

Example I.—17β-cyano-Δ⁴-estren-3-one

Step A: 3,3 - ethylenedioxy-Δ⁵⁽¹⁰⁾-estren-17-one.—3.85 gm. of pyridine hydrochloride were dissolved in 770 ml. of glycol. The solution was brought to 60°–65° C. and 77 gm. of 3,3-dimethoxy-Δ⁵⁽¹⁰⁾-estren-17-one obtained by the process described in the French Pat. 1,325,398 were added. The mixture was agitated for 1 minute. Crystallization started and the agitation was maintained for 4 minutes at 60°–65° C. 1 liter of iced water was added, then the mixture was poured into 15 liter of iced water, and the agitation was continued for 1 hour.

The precipitate was vacuum filtered, washed with water and then dissolved in methylene chloride. The aqueous phase was decanted and the organic phase was dried over sodium sulfate and evaporated to dryness under vacuum.

The residue was dissolved in 210 ml. of isopropyl ether, about 70 ml. of the solvent was distilled off, and the mixture was chilled overnight. The precipitate was vacuum filtered and dried under vacuum at 80° C. 58 gm. of 3,3-ethylenedioxy-Δ⁵⁽¹⁰⁾-estren-17-one were obtained in the form of colorless crystals melting at 133° C. and soluble in chloroform, and insoluble in water.

I.R. spectra (chloroform).—Presence of complex C=O at 1,738 and 1.732 cm.⁻¹ and of ketal. This compound is identical to that described in U.S. Pat. No. 2,806,030.

Step B: 3,3,-ethylenedoxy-17ξ-hydroxy - 17ξ - cyano-Δ⁵⁽¹⁰⁾-estrene.—12.45 gm. of 3,3 - ethylenedioxy - Δ⁵⁽¹⁰⁾-estren-17-one and 25.6 gm. of potassium cyanide were dissolved with agitation in 625 ml. of methanol. 20.3 ml. of acetic acid were added and the mixture was agitated for 24 hours at room temperature. Thereafter, the reaction mixture was brought to a pH of 6 by the addition of acetic acid and poured into iced water. The aqueous mixture was extracted with methylene chloride. The aqueous phases were washed with water, dried over sodium sulfate, filtered and distilled to dryness under vacuum.

The residue was dissolved in 50 ml. of ethyl acetate at 60° C., filtered and chilled. The precipitate was vacuum filtered and dried at 80° C. under vacuum. 6.617 gm. of 3,3-ethylenedioxy-17ξ-hydroxy-17ξ-cyano - Δ⁵⁽¹⁰⁾ - estrene were obtained in the form of colorless crystals melting at 196° C. and soluble in chloroform, and insoluble in water.

Analysis.—$C_{21}H_{29}NO_3$; molecular weight=343.45.—Calculated (percent): N, 4.08. Found (percent): N, 4.2.

I.R. spectra (chloroform).—Presence of C≡N at 2,235 cm.⁻¹, of ketal and of OH.

Step C: 3,3 - ethylenedioxy-17-cyano-Δ⁵⁽¹⁰⁾,¹⁶ - estradiene.—A mixture of 15 gm. of 3,3-ethylenedioxy-17ξ-hydroxy-17ξ-cyano-Δ⁵⁽¹⁰⁾-estrene, 75 ml. of pyridine and 15 ml. of phosphorus oxychloride were agitated for 4 hours at 80° C. The reaction mixture was brought to room temperature, poured into a chilled saturated aqueous solution of sodium bicarbonate, and extracted with methylene chloride. The organic phases were washed with water, dried over sodim sulfate, filtered and evaporated to dryness under vacuum.

The residue was subject to chromatography through silica gel with elution with a mixture (1:1) of ether and petroleum ether. After evaporation of the solvent, 11.44 gm. of the raw product were recovered. 800 mg. of this raw product were dissolved in 4 ml. of isopropyl ether at boiling and the solution was chilled. The precipitate was vacuum filtered, dried under vacuum at 70° C., and 395 mg. of 3,3-ethylenedioxy-7-cyano-Δ⁵⁽¹⁰⁾, ¹⁶-estradiene were obtained in the form of colorless crystals melting at 129° C. and soluble in chloroform and ethanol, and insoluble in water.

Analysis.—$C_{21}H_{27}NO_2$; molecular weight=325.43.—Calculated (percent): N, 4.31. Found (percent): N, 4.6.

I.R. spectra (chloroform).—Presence of conjugated C≡N at 2,212 cm.⁻¹, of C=C at 1,591 cm.⁻¹ and of ketal. Absence of OH.

Step D: 3,3-ethylenedioxy - 17β-cyano-Δ⁵⁽¹⁰⁾-estrene.—2 gm. of alumina containing 5% of palladium, treated with lead acetate (Lindlar type of catalyst. Helv. 35, 336, 1952), in suspension in 300 ml. of ethyl acetate were saturated with hydrogen. 10.2 gm. of 3,3-ethylenedioxy-17-cyano-Δ⁵⁽¹⁰⁾, ¹⁶-estradiene were added under nitrogen, and 645 ml. of hydrogen were passed into the mixture at room temperature. The mixture was filtered and the filter was washed with methylene chloride. The filtrate obtained was evaporated to dryness under vacuum.

The residue was dissolved in 20 ml. of hot isopropylether, filtered and chilled. The crystals were vacuum filtered and dried under vacuum at 65° C. 8.64 gm. of 3,3-ethylenedioxy - 17β - cyano-Δ⁵⁽¹⁰⁾-estrene were obtained in the form of colorless crystals melting at 109° C., and soluble in chloroform and insoluble in water.

Analysis.—$C_{21}H_{29}NO_2$; molecular weight=327.45.—Calculated (percent): N, 4.28. Found (percent): N, 4.4.

I.R. spectra (chloroform).—Presence of C≡N at 2,231 cm.⁻¹ and of ketal.

Step E: 17β-cyano-Δ⁴-estren-3-one.—9 gm. of 3,3-ethylenedioxy-17β-cyano-Δ⁵⁽¹⁰⁾-estrene were agitated at room temperature for 1 hour with 180 ml. of a mixture containing 162 ml. of acetic acid, 5.4 ml. of hydrochloric acid and 12.6 ml. of water. The reaction mixture was poured into ice water, agitated for 30 minutes and vacuum filtered. The precipitate was washed with water until the wash waters were neutral and dried at 80° C. under vacuum.

The residue was purified by recrystallization from methanol, then from a methanol/methylene chloride (100:20) mixture, 5.61 gm. of 17β-cyano-Δ⁴-estren-3-one were obtained in the form of colorless crystals melting at 199° C. and soluble in chloroform, ethanol and methanol, and insoluble in water. Specific rotation was $$[\alpha]_D^{20} = +114° \pm 3$$

(c.=0.5% in ethanol).

Analysis.—$C_{19}H_{25}NO$; molecular weight=283.40.—Calculated (percent): C, 80.52; H, 8.89; N, 4.94. Found (percent): C, 80.3; H, 9.0; N, 4.8.

I.R. spectra (chloroform).—Presence of C≡N at 2,236 cm.⁻¹ and Δ⁴-3-one, C=O at 1,660 cm.⁻¹ and C=C at 1,611 cm.⁻¹.

U.V. spectra (ethanol).—Max. at 240 nm. ε=17,500.

MNR spectra (Deutero chloroform).—H₄ 357 Hz. 18 CH₃ 61.5 Hz.

Example 2.—17β-cyano-Δ⁴,⁹-estradiene-3-one

Step A: 17β-cyano-Δ⁵⁽¹⁰⁾-estrene-3-one.—A mixture of 500 mg. of 3,3-ethylenedioxy-17β-cyano-Δ⁵⁽¹⁰⁾-estrene (obtained in step D of Example 1) 25 ml. of a 66% aqueous solution of acetic acid and 10 ml. of ether were agitated during 25 hours at room temperature. The reaction mixture was then poured into iced water and extracted with methylene chloride. The organic phases were washed with an aqueous solution of sodium bicarbonate, then with water, dried over sodium sulfate, filtered and evaporated to dryness in vacuo.

The residue was subjected to chromatography through silica gel with elution with a mixture (1:1) of ether and petroleum ether. After evaporation of the eluant, 300 mg. of 17β-cyano-Δ$^{5(10)}$-estren-3-one were obtained, which was used, as such, in the following step.

For analysis the product was recrystallized from a mixture (5:1) of isopropyl ether and methanol.

The compound occurred as colorless crystals melting at 124° C., and soluble in chloroform and methanol and insoluble in water.

*Analysis.*—$C_{19}H_{25}NO$; molecular weight=283.40.— Calculated (percent): C, 80.52; H, 8.89; N, 4.94. Found (percent): C, 80.7; H, 9.2; N, 5.9.

I.R. spectra (chloroform).—Presence of C=O at 1,716 cm.$^{-1}$ and of C≡N at 2,235 cm.$^{-1}$.

Step B: 17β-cyano-Δ$^{4,9}$-estradien-3-one.—11 gm. of 17β-cyano-Δ$^{5(10)}$-estren-3-one were dissolved in 110 ml. of pyridine. The solution was chilled to 0° to +5° C. 27.2 ml. of a methanolic solution of bromine, containing 24 gm. of Br per 100 ml. were added and the mixture was agitated for 18 hours at room temperature. The reaction mixture was then poured into 1.5 liter of iced water, containing 110 ml. of hydrochloric acid. The precipitate was vacuum filtered, washed with water and dried under vacuum at 70° C.

3 gm. of the residue was recrystallized from a mixture (8:6) of isopropyl ether and methanol, then from methanol. 2.2 gm. of 17β-cyano-Δ$^{4,9}$-estradien-3-one were obtained in the form of colorless crystals melting at 189–190° C., and soluble in chloroform and ethanol, and insoluble in water. The specific rotation is $$[\alpha]_D^{20} = -188° \pm 4$$

(c.=0.5% in chloroform).

*Analysis.*—$C_{19}H_{23}NO$; molecular weight=281.38.— Calculated (percent): C, 81.10; H, 8.24; N, 4.98. Found (percent): C, 81.3; H, 8.0; N, 5.2.

I.R. spectra (chloroform).—Presence of C≡N at 2,240 cm.$^{-1}$, of C=O at 1,661 and 1,649 cm.$^{-1}$ and of C=C at 1,610 cm.$^{-1}$.

U.V. spectra (ethanol):

Max. at 215 nm. $E_{1 cm.}^{1\%} = 223$

Infl. toward 233 nm. $E_{1 cm.}^{1\%} = 173$

Max. at 305 nm. $E_{1 cm.}^{1\%} = 763$ or $\epsilon = 21,500$

Example 3.—17β-cyano-Δ$^{4,9,11}$-estratrien-3-one

Step A: 3 - pyrrolidinyl-17β-cyano-Δ$^{3,5(10)9(11)}$-estratriene.—A mixture of 7.5 gm. of 17β-cyano-Δ$^{4,9}$-estradien-3-one (obtained in Example 2), 30 ml. of methanol and 7.5 ml. of pyrrolidine was agitated for 15 minutes at reflux, then chilled for 30 minutes. The precipitate was vacuum filtered and dried under vacuum. 7.4 gm. of 3-pyrrolidinyl-17β-cyano-Δ$^{3,5(10),9(11)}$-estratriene were obtained in the form of yellow crystals melting at 193° C. and soluble in chloroform and benzene, and insoluble in water.

*Analysis.*—$C_{23}H_{30}N_2$; molecular weight=334.49.— 8.1% N (theory 8.3%).

I.R. spectra (chloroform).—Presence of C≡N at 2,231 cm.$^{-1}$ and of conjugated system at 1,621 and 1,598 and 1,550 cm.$^{-1}$.

U.V. spectra (benzene).—Max at 357 nm. $\epsilon = 19,100$.

Step B: 17β-cyano-Δ$^{5(10),9(11)}$-estradien-3-one.—A mixture of 7.4 gm. of 3-pyrrolidinyl-17β-cyano-Δ$^{3,5(10),9(11)}$-estratriene, 74 ml. of water, 74 ml. of ether and 3.7 ml. of acetic acid was agitated for 2 hours. The ether was evaporated. The mixture was poured into iced water. The precipitate was vacuum filtered, washed with water and dried under vacuum at 50° C. 5.814 gm. of 17β-cyano-Δ$^{5(10),9(11)}$-estradien-3-one were obtained in the form of cream-colored crystals melting at 144° C., and soluble in chloroform and ethanol, and insoluble in water.

I.R. spectra (chloroform).—Presence of C=O at 1,720 cm.$^{-1}$ and of C≡N at 2,230 cm.$^{-1}$.

U.V. spectra (ethanol):

Max. at 240 nm. $E_{1 cm.}^{1\%} = 698$ or $\epsilon = 19,600$

Max. at 285 nm. $E_{1 cm.}^{1\%} = 21$

Step C: 17β-cyano-Δ$^{4,9,11}$-estratrien-3-one.—3.5 gm. of 17β-cyano-Δ$^{5(10),9(11)}$-estradien-3-one were dissolved in 70 ml. of dioxane, 5.65 gm. of dichlorodicyanobenzoquinone were added and the mixture was agitated for six hours under nitrogen. The reaction mixture was then poured into water and extracted with methylene chloride. The organic phases were washed with an aqueous solution of sodium hydrosulfite, then with water, dried over sodium sulfate, filtered and evaporated to dryness.

The residue was dissolved in methylene chloride. The solution was passed over alumina and evaporated to dryness. The residue was dissolved in a mixture (5:1) of isopropyl ether and methanol at boiling, and chilled. The precipitate was vacuum filtered and dried. 1.624 gm. of 17β-cyano-Δ$^{4,9,11}$-estratrien-3-one were obtained in the form of colorless crystals melting at 146° C. and soluble in chloroform and ethanol, and insoluble in water. The specific rotation is $[\alpha]_D^{20} = +75° \pm 2$ (c.=0.6% in chloroform).

*Analysis.*—$C_{19}H_{21}NO$; molecular weight=279.37.— Calculated (percent): C, 81.68; H, 7.58; N, 5.01. Found (percent): C, 81.4; H, 7.5; N, 4.9.

I.R. spectra (chloroform).—Presence of C≡N at 2,237 cm.$^{-1}$, of trienone C=O at 1,662 and 1,650 cm.$^{-1}$ and C=C at 1,580 and 1,575 cm.$^{-1}$.

U.V. spectra (ethanol):

Max. at 237 nm. $E_{1 cm.}^{1\%} = 222$

Max. at 337 nm. $E_{1 cm.}^{1\%} = 1,100$ or $\epsilon = 30,700$

Example 4.—Pharmacological studies (1) Determination of the progestomimetic activity: The progestomimetic activity was determined by the Clauberg test. According to this test, sexually immature rabbits are first sensitized by subcutaneous administration of estradiol benzoate for 5 days at a daily dose of 10 μg. They are next treated daily for 5 days with the medicament being studied. The animals are sacrificed on the sixth day and, on the uterus sections, the lace-like proliferation of the endometrium, characteristic for the progestomimetic action, are noted in MacPhail units.

The studied compounds utilized in solution in sesame seed oil containing 5% of benzyl alcohol, were subcutaneously administrated at different doses.

The obtained results are summarized in the following Table I.

TABLE I

| Product | Daily doses, γ | Mac-Phail units |
|---|---|---|
| 17β-cyano-Δ$^4$-estren-3-one | 500 | 2.6 |
| | 2,500 | 2.8 |
| 17β-cyano-Δ$^{4,9}$-estradien-3-one | 200 | 2.3 |
| 17β-cyano-Δ$^{4,9,11}$-estratrien-3-one | 200 | 2.0 |
| | 1,000 | 2.8 |

These results show, that the studied products possess an important progestomimetic activity on subcutaneous administration.

(2) Investigation of the anti-estrogenic activity: The anti-estrogenic activity was investigated parallel to that of the uterotrophic activity on sexually-immature mice by a technique, inspired by the Rubin test (Endo. 1951, 49, 429) and similar to that of Dorfman et al. (Methods in Hormone Research, Dorfman, 1962, vol. II, 118).

The estrogen used is estradiol. Mice, aged from 19 to 21 days, received in daily subcutaneous injection, for 3 days, either the estradiol or the tested product alone, or the estradiol and the tested product. In the last case, the two steroids were injected at different points. The mice were sacrificed on the 4th day and their uterus was removed and weighed.

Estradiol, in solution of sesame seed oil containing 5% of benzyl alcohol, was administered at a total dose of 0.27γ with each injection being a volume of 0.1 ml./mouse. The tested products were utilized in solution in sesame seed oil containing 5% of benzyl alcohol, and administered in various dosages in a volume of 0.1 ml./mouse.

The obtained results are summarized in the following Tables II to VII.

TABLE II
(a) Investigation of an uterotrophic activity of 17β-cyano-Δ⁴-estren-3-one

| Lots | Doses, γ | Weight of uterus in mg. |
|---|---|---|
| Controls | 0 | 7.4 |
| Estradiol | 0.27 | 52.4 |
| Tested product | 10 | 7.6 |
|  | 30 | 9.3 |
|  | 90 | 10.9 |

TABLE III
(b) Anti-estrogenic activity of 17β-cyano-Δ⁴-estren-3-one

| Lots | Doses, γ | Weight of uterus in mg. |
|---|---|---|
| Controls | 0 | 7.4 |
| Estradiol | 0.27 | 52.4 |
| Test product plus estradiol | 10 plus 0.27 | 39.6 (−25%) |
| Do | 30 plus 0.27 | 36.1 (−31%) |
| Do | 90 plus 0.27 | 30.0 (−41%) |

TABLE IV
(c) Investigation of an uterotrophic activity of 17β-cyano-4,9-estradien-3-one

| Lots | Doses, γ | Weight of uterus in mg. |
|---|---|---|
| Controls | 0 | 12.8 |
| Estradiol | 0.27 | 54.3 |
| Test product | 90 | 15.4 |
|  | 270 | 14.0 |
|  | 810 | 21.2 |

TABLE V
(d) Anti-estrogenic activity of 17β-cyano-Δ⁴,⁹-estradien-3-one

| Lots | Doses, γ | Weight of uterus in mg. |
|---|---|---|
| Control | 0 | 12.8 |
| Estradiol | 0.27 | 54.3 |
| Test product plus estradiol | 90 plus 0.27 | 49.1 |
| Do | 270 plus 0.27 | 33.1 (−39%) |
| Do | 810 plus 0.27 | 31.1 (−42%) |

TABLE VI
(e) Investigation of an uterotrophic activity of 17β-cyano-4,9,11-estratrien-3-one.

| Lots | Doses, γ | Weight of uterus in mg. |
|---|---|---|
| Controls | 0 | 12.6 |
| Estradiol | 0.27 | 55.5 |
| Test product | 10 | 13.8 |
|  | 30 | 13.3 |
|  | 90 | 12.9 |

TABLE VII
(f) Anti-estrogenic activity of 17β-cyano-Δ⁴,⁹,¹¹-estratrien-3-one

| Lots | Doses | Weight of uterus in mg. |
|---|---|---|
| Controls | 0 | 12.6 |
| Estradiol | 0.27 | 55.5 |
| Test product plus estradiol | 10 plus 0.27 | 45.2 |
| Do | 30 plus 0.27 | 26.3 (−53%) |
| Do | 90 plus 0.27 | 26.5 (−53%) |

These results of Tables II to VII show that the test products possess a considerable anti-estrogenic activity with reference to estradiol, and that they demonstrate no uterotrophic effect by themselves.

(3) Exogenic anti-androgenic activity: The exogenic anti-androgenic activity was determined with reference to testosterone propionate in castrated male rats, by the Lerner method, described by Dorfman in "Methods in Hormones Research," II, page 320.

Young male rats, aged about 4 weeks, were castrated. The treatment started on the day after the castration and lasted 7 days. On the 8th day, the animals were sacrificed and the following organs removed; prostate, seminal vesicles and levator ani.

The products studied and testosterone propionate were utilized in sesame seed oil containing 5% of benzyl alcohol. The medicaments were administered separately subcutaneously, the products studied at the dose of 1 mg., testosterone propionate at the dose of 50γ (daily dose per rat).

The following groups of rats were thus formed:

(a) a control group, which received the solvent;
(b) a group of rats, to which 50γ of testosterone propionate was administered subcutaneously;
(c) a group of rats, to which 1 mg. of the product studied was subcutaneously administered;
(d) a group of rats, which received 1 mg. of the product studied subcutaneously and 50γ of testosterone propionate subcutaneously.

The following Tables VIII to X summarize the results obtained:

TABLE VIII
(a) 17β-cyano-Δ⁴,⁹-estradien-3-one

| Lots | Daily doses | Fresh levator ani, mg. | Seminal vesicles, mg. | Prostate, mg. |
|---|---|---|---|---|
| Controls | 0 | 20.9 | 10.3 | 10.4 |
| Testosterone propionate | 50γ | 38.7 | 61.3 | 90.5 |
| Product studied | 1 mg. | 29.9 | 9.3 | 16.0 |
| Product studied plus testosterone propionate | 1 mg. plus 50γ | 32.8 (−17%) | 34.1 (−45%) | 58.5 (−37%) |

TABLE IX
(b) 17β-cyano-Δ⁴,⁹,¹¹-estratrien-3-one

| Lots | Daily doses | Fresh levator ani, mg. | Seminal vesicles, mg. | Prostate, mg. |
|---|---|---|---|---|
| Controls | 0 | 20.9 | 10.3 | 10.4 |
| Testosterone propionate | 50γ | 38.7 | 61.3 | 90.5 |
| Product studied | 1 mg. | 29.3 | 12.3 | 27.9 |
| Product studied plus testosterone propionate | 1 mg. plus 50γ | 42.2 | 32.8 (−46%) | 51.9 (−42%) |

TABLE X
(c) 17β-cyano-Δ⁴-estren-3-one

| Lots | Daily doses | Fresh levator ani, mg. | Seminal vesicles, mg. | Prostate, mg. |
|---|---|---|---|---|
| Controls | 0 | 31.06 | 7.36 | 12.58 |
| Testosterone propionate | 50γ | 44.00 | 66.82 | 103.90 |
| Product studied | 1 mg | 28.00 | 6.35 | 12.10 |
| Product studied plus testosterone propionate | 1 mg. plus 50γ | 38.87 | 59.05 (−12%) | 83.27 (−20%) |

From these results, it can be noted that 17β-cyano-Δ⁴,⁹-estradien-3-one and 17β-cyano-Δ⁴,⁹,¹¹-estratrien-3-one exercise an important exogenic anti-androgenic activity at a dose of 1 mg. with reference to 50γ of testosterone propionate and that the activity of 17β-cyano-Δ⁴-estren-3-one, although weaker, is still clear.

(4) Determination of the anti-gonadotrophic activity: The anti-gonadotrophic activity was determined in puberal rats, weighing about 200 gm. The product studied, utilized in solution in olive oil containing 5% of benzyl alcohol, were administered subcutaneously in a volume of 0.2 ml., at the ratio of 12 treatments in 14 days. On the 15th day, the rats were sacrificed by carotid bleeding, and the seminal vesicles, the prostate, the testicles and the suprarenals were removed and weighed.

The obtained results are summarized in the following Table XI.

TABLE XI

| Lots | Daily doses, mg. | Testicles, mg. | Seminal vesicles, mg. | Prostate, mg. | Suprarenals, mg. |
|---|---|---|---|---|---|
| Controls | 0 | 2,838 | 529.58 | 320.18 | 40.28 |
| 17β-cyano-Δ⁴-estren-3-one | 2 | 2,670 | 358.24 (−32%) | 262.04 (−18%) | 40.98 |
| Controls | 0 | 2,990 | 864.5 | 451.6 | 46.4 |
| 17β-cyano-Δ⁴,⁹-estradien-3-one | 2 | 3,090 | 620.5 (−28%) | 348.3 (−23%) | 48.7 |
| Controls | 0 | 2,990 | 864.5 | 451.6 | 46.4 |
| 17β-cyano-Δ⁴,⁹,¹¹-estratrien-3-one | 2 | 2,890 | 513.9 (−40%) | 311.2 (−31%) | 43.7 |

These results demonstrate that the 3 products studied possessed a certain anti-gonadotrophic activity at a daily dose of 2 mg.

The preceding specific embodiments are illustrative of the practice of the invention. It is to be understood, however, that other expedients known to those skilled in the art or disclosed herein, may be employed without departing from the spirit of the invention or the scope of the appended claims.

We claim:
1. 17β-cyano steroids having the formula

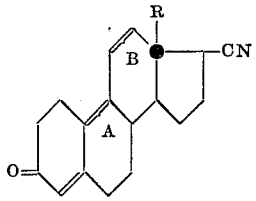

wherein R is alkyl having 1 to 3 carbon atoms, A is selected from the group consisting of two hydrogens and a double bond and B is selected from the group consisting of two hydrogens and a double bond, with the proviso that when B is a double bond, A is a double bond.

2. The compound of claim 1 wherein A and B are both two hydrogens.

3. The compound of claim 2 being 17β-cyano-Δ⁴-estren-3-one.

4. The compound of claim 1 wherein A is a double bond and B is two hydrogens.

5. The compound of claim 4 being 17β-cyano-Δ⁴,⁹-estradien-3-one.

6. The compound of claim 1 wherein A and B are both double bonds.

7. The compound of claim 6 being 17β-cyano-Δ⁴,⁹,¹¹-estratrien-3-one.

8. The process for the preparation of the 17β-cyano steroids of claim 1 comprising reacting a 3,3-dilower alkyl ketal of a 13β-R-Δ⁵⁽¹⁰⁾-gonen-3,17-dione with a cyclic ketalization agent seelcted from the group consisting of lower alkylene glycols and dioxolanes, reacting the resultant 3-ketal steroid having the formula

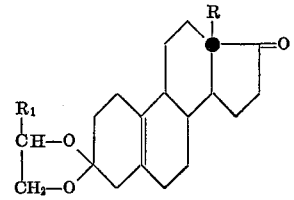

wherein R has the previously assigned value, $R_1$ is hydrogen or alkyl having 1 to 5 carbon atoms, with a cyanidation agent selected from the group consisting of (1) and alkali metal cyanide in a lower alkanol and (2) acetone cyanohydrin in an alkaline medium, dehydrating the resultant 17-cyano-17-hydroxy steroid having the formula

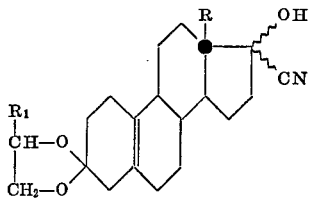

wherein R and $R_1$ have the above-assigned values by the action of an acidic dehydrating agent selected from the group consisting of phosphorus oxychloride and thionyl chloride, in the presence of pyridine, reducing the Δ¹⁶-double bond of the resulting 17-cyano-Δ¹⁶ steroid having the formula

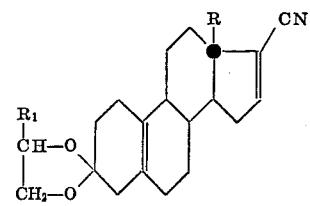

wherein R and $R_1$ have the above-assigned values, by selective hydrogenation in the presence of palladium on alumina, treated with lead acetate, as a Lindlar type hydrogenation catalyst, subjecting the resulting 3-ketal-17β-cyano steroid having the formula

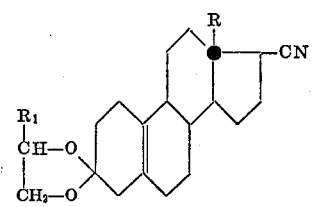

wherein R and $R_1$ have the above-assigned values to acid hydrolysis and recovering said 17β-cyano steroids.

9. The process of claim 8 wherein said 3-ketal-17β-cyano steroid is hydrolyzed with a strong acid and a 17β- cyano steroid where A and B are both two hydrogens is recovered.

10. The process of claim 8 wherein said 3-ketal-17β-cyano steroid is hydrolyzed with an organic carboxylic acid having 2 to 6 carbon atoms, the resultant 17β-cyano-Δ⁵⁽¹⁰⁾-steroid having the formula

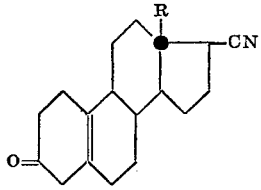

wherein R has the prior assigned values is subjected to a bromination, then dehydrobromination by means selected from the group consisting of bromine in pyridine and pyridinium perbromide in pyridine, and a 17β-cyano steroid where A is a double bond and B is two hydrogens is recovered.

11. The process of claim 8 wherein said 3-ketal-17β-cyano steroid is hydrolyzed with an organic carboxylic acid having 2 to 6 carbon atoms, the resultants 17β-cyano-Δ⁵⁽¹⁰⁾-steroid having the formula

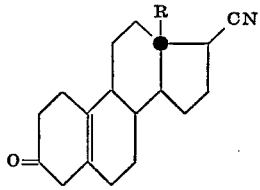

wherein R has the prior assigned values is subjected to a bromination, then dehydrobromination by means selected from the group consisting of bromine in pyridine and pyridinium perbromide in pyridine, the resultant 17-cyano steroid where A is a double bond and B is two hydrogens is reacted with a secondary amine selected from the group consisting of di-lower alkylamines, lower alkyl-phenylamines pyrrolidine, pyrrole, morpholine and piperazine, the resultant 3-enamine having the formula

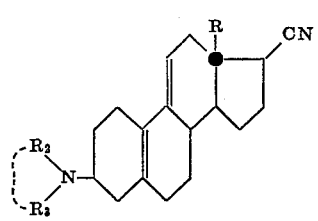

wherein R has the prior assigned values, $R_2$ and $R_3$ represent members selected from the group consisting of two lower alkyls, a phenyl and a lower alkyl, alkylene having 4 to 5 carbon atoms, ethyloxaethylene and ethylazaethylene, is hydrolyzed in an acidic medium, the resultant 13β-R-17β-cyano-Δ⁵⁽¹⁰⁾,⁹⁽¹¹⁾-gonadiene-3-one, where R has the prior assigned values is subjected to the dehydrogenating action of a substituted parabenzoquinone and a 17β-cyano steroid is recovered where A and B are both double bonds.

12. Cyanohydrins having the formula

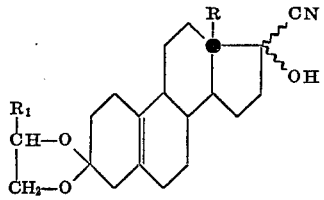

wherein R is alkyl having 1 to 3 carbon atoms and $R_1$ is hydrogen or alkyl having 1 to 5 carbon atoms.

13. 17-cyano-Δ¹⁶ steroids having the formula

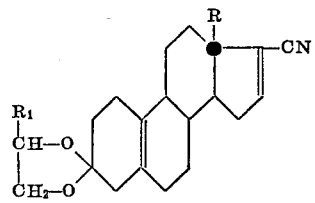

wherein R is alkyl having 1 to 3 carbon atoms and $R_1$ is hydrogen or alkyl having 1 to 5 carbon atoms.

14. 3-ketal-17β-cyano steroids having the formula

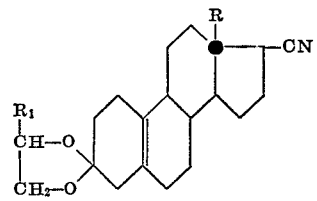

wherein R is alkyl having 1 to 3 carbon atoms and $R_1$ is hydrogen or alkyl having 1 to 5 carbon atoms.

15. 17β-cyano-Δ⁵⁽¹⁰⁾ steroids having the formula

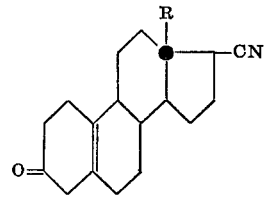

wherein R is alkyl having 1 to 3 carbon atoms.

16. 3-enamines having the formula

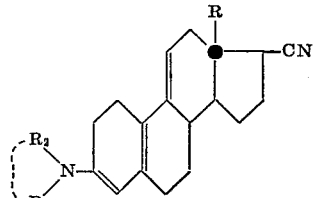

wherein R is alkyl having 1 to 3 carbon atoms and $R_2$ and $R_3$ represent members selected from the group consisting of two lower alkyls, a phenyl and a lower alkyl, alkylene having 4 to 5 carbon atoms, ethyloxaethylene and ethylazaethylene.

17. 17β-cyano-Δ⁵⁽¹⁰⁾,⁹⁽¹¹⁾ steroids having the formula

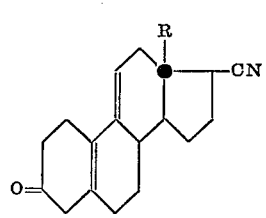

wherein R is alkyl having 1 to 3 carbon atoms.

References Cited
UNITED STATES PATENTS

| | | | |
|---|---|---|---|
| 2,326,756 | 8/1943 | Butenandt et al. | 260—397.5 |
| 3,301,878 | 1/1967 | Joly et al. | 260—397.3 |
| 3,383,385 | 5/1968 | Bucourt et al. | 260—239.57 |

HENRY A. FRENCH, Primary Examiner

U.S. Cl. X.R.

260—239.55 R, 239.55 C, 397, 397.3; 424—242